3,104,254
PREPARATION OF PHOSPHORUS BORON COMPOUNDS
Theodor Reetz, Webster Groves, Mo., assignor to Monsanto Chemical Company, St. Louis, Mo., a corporation of Delaware
No Drawing. Continuation of application Ser. No. 9,718, Feb. 19, 1960. This application Sept. 18, 1961, Ser. No. 138,608
14 Claims. (Cl. 260—461)

This invention relates to phosphorus boron compounds. More particularly, it is concerned with a novel and improved process for preparing compounds which may be designated as hydrocarbon substituted phosphite borines, hydrocarbon substituted phosphonite borines and hydrocarbon substituted phosphinite borines.

The compounds prepared by the process of this invention have not been previously described in the prior art. Such compounds, and other and different methods for preparing the same, are the subject of copending applications, Serial No. 807,327, filed April 20, 1959, now abandoned, and Serial No. 138,587, filed September 18, 1961. These compounds are characterized by being relatively stable in comparison to some of the known boron-hydrogen compounds. For example, such boron compounds as diborane, sodium borohydride and trimethylamine borine have been found to react with dilute acids such as hydrochloric and sulfuric acids to form hydrogen and boric acid. On the other hand, most of the phosphorus boron compounds prepared by the process of this invention not only fail to react with such acids, but are also resistant towards iodine. It is known that phosphites, phosphonites nad phosphinites react rapidly wtih iodine to form the pentavalent phosphorus ester as follows:

(I)    $P(OR)_3 + I_2 + H_2O \rightarrow OP(OR)_3 + 2HI$ wherein R represents a hydrocarbon radical. The above reaction, carried out in the presence of ethanol and sodium bicarbonate, has been employed for the purpose of verifying the formation and purity of the compounds prepared by the process of this invention. In most cases the reaction product consumed either no iodine or only very minor amounts indicating either the absence of any of the starting trivalent phosphorus compound or no more than about 5 percent of such compound.

By the process of this invention, compounds of the following structural formula are prepared:

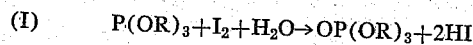

where $a$, $b$ and $c$ are each equal to 0 or 1, and where the sum of $a+b+c$ is in the range of 1 to 3. In said formula, X, Y and Z represent monovalent hydrocarbon radicals. As used in this application, "hydrocarbon radicals" assumes its broad sense, and includes not only the aliphatic, aryl, aralkyl and cycloaliphatic radicals but also the derivatives thereof which contain one or more non-reactive substituents such as alkyl groups, e.g. methyl, ethyl, propyl and butyl. Other nonreactive substituents include the halogens such as chlorine and fluorine. By non-reactive substituents is meant those radicals which will not interfere with the formation of the phosphorus boron compounds under the reaction conditions employed. Illustrative of the substituted aryl radicals contemplated above are the following: tolyl, xylyl, cumyl, ethylphenyl, methylnaphthyl, and the like. The aralkyl radicals referred to above may also contain these and other similar substituted aryls.

In practicing the process of this invention, it is preferred to employ starting phosphorus compounds wherein X, Y and Z are selected from saturated or unsaturated aliphatic radicals having up to about 18 carbon atoms, cycloalkyl radicals having 5 or 6 carbon atoms in the ring, aralkyl radicals wherein the alkyl group having the free valence contains up to about 4 carbon atoms, phenyl and naphthyl. As regards the aliphatic radicals employed, it should be understood that both the straight and branched chain isomers are contemplated.

It is therefore an object of this invention to provide an improved process for preparing phosphorus boron compounds of the type defined above. It is a more particular object of the invention to provide a process for production of such compounds wherein the reactants are relatively inexpensive and readily available. Further objects and advantages of this invention will become apparent upon consideration of the following detailed description.

The novel process of this invention may be illustrated by the equation:

(II)    $3NaH + 4BF_3 \cdot (C_2H_5)_2O + P(OR)_3$
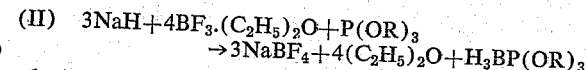
$\rightarrow 3NaBF_4 + 4(C_2H_5)_2O + H_3BP(OR)_3$ where R has the same meaning as above. In my copending application, the phosphorus starting material is reacted wtih one of several classes of compounds capable of releasing borine. Such compounds include sodium borohydride, boranes such as diborane, and the amine borines. These boron compounds are expensive to employ and thus introduce an undesirable economic factor. Said compounds also present a problem in regard to availability. These difficulties have been avoided by the instant process which makes use of sodium hydride and a boronfluoride-ether complex. Such complexes are coordination compounds and are generally known as etherates. By way of illustration, the boronfluoride etherates contemplated here include boronfluoride methyl ether, boronfluoride ethyl ether, boronfluoride methylethyl ether, boronfluoride isopropyl ether, boronfluoride methn-amyl ether, boronfluoride phenylmethyl ether, boronfluoride phenylethyl ether, boronfluoride dioxane and boronfluoride tetrahydrofuran. Each of these reactants is commercially available at prices considerably lower than those of the materials previously used.

Generally, the reaction proceeds over a rather wide range of temperatures. Depending upon the specific starting phosphorus compound selected, such temperatures may vary from about −50° C. up to room temperature or higher. In charging the reaction vessel, the sodium hydride is usually added in the form of a slurry. This slurry, and the starting phosphorus compound, are always added before the boronfluoride. In order to render the reaction mixture more stirrable, the use of a solvent or diluent is preferred. The solvent must necessarily be inert with respect to the reactants, and an ether is most often employed. Included among the usable, well known ether solvents are ethyl ether, isopropyl ether, butyl ether, bis(2-methoxyethyl) ether, dioxane, tetrahydrofuran and the like. The selected ether is added to the reaction vessel prior to the addition of the boron fluoride-ether complex. It should be pointed out that only a small amount of the solvent or diluent is required since additional ether will be liberated from said complex as the reaction proceeds. If desired, the use of a complex can be avoided by simply employing the components thereof. Thus a larger amount of the solvent or diluent ether is added to the reaction vessel after the phosphorus compound and the sodium hydride. There is then added boronfluoride as a gas. Said mount of a ether should be in excess of the amount necessary to form an etherate complex with the boronfluoride.

The invention will be more fully understood by reference to the following examples which illustrate representative phosphorus boron compounds which are prepared. It should be recognized that such compounds are only exemplary, and are not to be construed as limiting the scope of this invention.

*Example I*

A suitable reaction vessel is charged with 15 grams of a 50% slurry of sodium hydride in mineral oil (7.5 grams NaH=0.31 mole), 30 grams of triisopropylphosphite (0.144 mole) and 80 ml. of tetrahydrofuran. There is then added 56.8 grams of boronfluoride-ethyl ether (0.40 mole) with stirring. The mixture is then stirred at −50° C. for about 30 minutes after which it is heated to 5° C. An exothermic reaction takes place, and the temperature rises to 30° C. The mixture is cooled to about 18° C. and held there for about 30 minutes. It is then heated to 50° C. and held there for one hour. The resulting reaction mixture is washed several times with water after which it is washed with dilute HCl to remove any unreacted phosphite. The product is then dried with $Na_2CO_3$ and subjected to vacuum, 10 mm. Hg at 50° C. There is obtained a yield of 19.8 grams. Removal of the 7.5 grams of mineral oil leaves 12.3 grams of triisopropylphosphite borine, $H_3BP(O-i-C_3H_7)_3$.

*Example II*

Following the procedure outlined in the preceding example, other and different phosphites are substituted for the triisopropylphosphite. Such starting materials are listed below, it being clear that the amount charged is in accordance with the molar ratio of reactants shown in Equation II. Next to each of such materials is listed the phosphorus boron product which is obtained. In the case of such products, the molecular formula is given.

| Starting material | Reaction product |
|---|---|
| triethylphosphite | $H_3BP(OC_2H_5)_3$ |
| tri-n-butylphosphite | $H_3BP(OC_4H_9)_3$ |
| tri-n-heptylphosphite | $H_3BP(OC_7H_{15})_3$ |
| tri-(2-ethylhexyl) phosphite | $H_3BP(OCH_2CHC_4H_9)_3$ <br> $\vert$ <br> $C_2H_5$ |
| tridecylphosphite | $H_3BP(OC_{10}H_{21})_3$ |
| tri-(tridecyl) phosphite | $H_3BP(OC_{13}H_{27})_3$ |
| tri-(octadecyl) phosphite | $H_3BP(OC_{18}H_{37})_3$ |
| triallylphosphite | $H_3BP(OC_3H_5)_3$ |
| tributenylphosphite | $H_3BP(OC_4H_7)_3$ |
| tricyclohexylphosphite | $H_3BP(OC_6H_{11})_3$ |
| tribenzylphosphite | $H_3BP(OCH_2C_6H_5)_3$ |
| tri-(phenylethyl) phosphite | $H_3BP(OC_2H_4C_6H_5)_3$ |
| triphenylphosphite | $H_3BP(OC_6H_5)_3$ |
| trinaphthylphosphite | $H_3BP(OC_{10}H_7)_3$ |

*Example III*

In the preparation of other phosphorus boron compounds of this invention, either a phosphinite or a phosphonite is substituted for the starting phosphite in the previous examples. Once again following the procedure of Example I, the starting phosphorus material is charged in a molar amount corresponding to the ratio of reactants set forth hereinabove. Such starting materials, and the phosphorus boron reaction products, are tabulated below.

| Starting material | Reaction product |
|---|---|
| Dimethylphenylphosphonite | $H_3BP(OCH_3)_2$ <br> $\vert$ <br> $C_6H_5$ |
| Dimethylethylphosphonite | $H_3BP(OCH_3)_2$ <br> $\vert$ <br> $C_2H_5$ |
| Diisopropyl-n-butylphosphonite | $H_3BP(O-i-C_3H_7)_2$ <br> $\vert$ <br> $n-C_4H_9$ |
| Diallylmethylphosphonite | $H_3BP(OC_3H_5)_2$ <br> $\vert$ <br> $CH_3$ |
| Diphenylethylphosphonite | $H_3BP(OC_6H_5)_2$ <br> $\vert$ <br> $C_2H_5$ |
| Diisobutylisobutylphosphonite | $H_3BP(O-i-C_4H_9)_2$ <br> $\vert$ <br> $i-C_4H_9$ |
| Diallylphenylphosphonite | $H_3BP(OC_3H_5)_2$ <br> $\vert$ <br> $C_6H_5$ |
| Ethyldiphenylphosphinite | $H_3BPOC_2H_5$ <br> $\vert$ <br> $(C_6H_5)_2$ |
| Methyldiethylphosphinite | $H_3BPOCH_3$ <br> $\vert$ <br> $(C_2H_5)_2$ |
| Hexyldiethylphosphinite | $H_2BPOC_6H_{13}$ <br> $\vert$ <br> $(C_2H_5)_2$ |
| Decyldimethylphosphinite | $H_3BPOC_{10}H_{21}$ <br> $\vert$ <br> $(CH_3)_2$ |
| Isobutyldiphenylphosphinite | $H_3BPO-i-C_4H_9$ <br> $\vert$ <br> $(C_6H_5)_2$ |
| Phenyldiethylphosphinite | $H_3BPOC_6H_5$ <br> $\vert$ <br> $(C_2H_5)_2$ |
| Ethyldibenzylphosphinite | $H_3BPOC_2H_5$ <br> $\vert$ <br> $(CH_2C_6H_5)_2$ |
| Isopropyldiethylphosphinite | $H_3BPO-i-C_3H_7$ <br> $\vert$ <br> $(C_2H_5)_2$ |
| Benzyldimethylphosphinite | $H_3BPOCH_2C_6H_5$ <br> $\vert$ <br> $(CH_3)_2$ |
| Methyldiallylphosphinite | $H_3BPOCH_3$ <br> $\vert$ <br> $(C_3H_5)_2$ |

The borines of this invention have considerable utility and are of particular value as gasoline additives for the prevention of pre-ignition. They are also employed as anti-oxidants, as catalysts, and as blowing agents in epoxy resins.

It will be apparent that process defined above is not to be construed as limited by the several specific examples set forth. Various modifications and alterations, obvious to those skilled in the art, may be made without departing from the spirit or scope of the invention.

This application is a continuation of my copending application Serial No. 9,718, filed February 19, 1960, the latter being a continuation-in-part of my copending application Serial No. 807,327, filed April 20, 1959, both now abandoned.

The embodiments of the invention in which an exclusive property or privilege is claimed are defined as follows:

1. A process of preparing a compound of the formula

where $a$, $b$ and $c$ are each integers selected from zero and one, the sum of $a+b+c$ is at least one, and X, Y and Z are each selected from the group consisting of saturated and mono-olefinically unsaturated acyclic radicals having from 1 to 18 carbon atoms, cycloalkyl radicals having from 5 to 6 carbon atoms in the ring, aralkyl radicals wherein the alkyl group having the free valence contains from 1 to 4 carbon atoms, monocyclic aromatic hydrocarbon radicals and naphthyl, which comprises reacting a compound of the formula

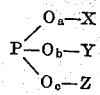

where $a$, $b$, $c$, X, Y and Z have the same meaning as above, with sodium hydride, boronfluoride and an ether.

2. A process as defined in claim 1 wherein the amount of ether employed is in excess of the amount of ether which will form a complex with the boronfluoride.

3. A process as defined in claim 1 wherein the reaction is carried out at a temperature of from about $-50°$ C. to at least about room temperature.

4. A process of preparing a compound of the formula

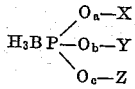

where $a$, $b$ and $c$ are each integers selected from zero and one, the sum of $a+b+c$ is at least one, and each of X, Y and Z is a saturated acyclic radical having from 1 to 18 carbon atoms, which comprises reacting a compound of the formula

where $a$, $b$, $c$, X, Y and Z have the same meaning as above, with sodium hydride, boronfluoride and an ether.

5. A process of preparing a compound of the formula

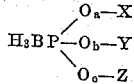

where $a$, $b$ and $c$ are each integers selected from zero and one, the sum of $a+b+c$ is at least one, and each of X, Y and Z is a monocyclic aromatic hydrocarbon radical, which comprises reacting a compound of the formula

where $a$, $b$, $c$, X, Y and Z have the same meaning as above, with sodium hydride, boronfluoride and an ether.

6. A process of preparing a compound of the formula

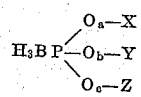

where $a$, $b$ and $c$ are each integers selected from zero and one, the sum of $a+b+c$ is at least one, and each of X, Y and Z is an aralkyl radical wherein the alkyl group having the free valence contains from 1 to 4 carbon atoms, which comprises reacting a compound of the formula

where $a$, $b$, $c$, X, Y and Z have the same meaning as above, with sodium hydride, boronfluoride and an ether.

7. A process of preparing a compound of the formula

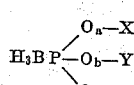

where $a$, $b$ and $c$ are each integers selected from zero and one, the sum of $a+b+c$ is at least one, and X, Y and Z are each selected from the group consisting of saturated and mono-olefinically unsaturated acyclic radicals having from 1 to 18 carbon atoms, cycloalkyl radicals having from 5 to 6 carbon atoms in the ring, aralkyl radicals wherein the alkyl group having the free valence contains from 1 to 4 carbon atoms, monocyclic aromatic hydrocarbon radicals and naphthyl, which comprises reacting a compound of the formula

where $a$, $b$, $c$, X, Y and Z have the same meaning as above, with sodium hydride and a boronfluoride etherate.

8. The process defined in claim 7 wherein the reaction is carried out at a temperature of from about $-50°$ C. to at least about room temperature.

9. The process defined in claim 7 wherein the reaction is carried out in the presence of an ether as a solvent.

10. The process defined in claim 7 wherein the phosphorus, sodium and boron reactants are employed in a molar ratio of about 1:3:4 respectively.

11. The process defined in claim 7 wherein the etherate is boronfluoride-ethyl ether.

12. A process of preparing a compound of the formula

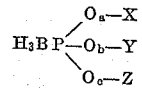

where $a$, $b$ and $c$ are each integers selected from zero and one, the sum of $a+b+c$ is at least one, and each of X, Y and Z is a saturated acyclic radical having from 1 to 18 carbon atoms, which comprises reacting a compound of the formula

where $a$, $b$, $c$, X, Y and Z have the same meaning as above, with sodium hydride and a boronfluoride etherate.

13. A process of preparing a compound of the formula

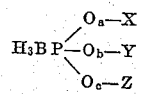

where $a$, $b$ and $c$ are each integers selected from zero and one, the sum of $a+b+c$ is at least one, and each of X, Y and Z is a monocyclic aromatic hydrocarbon radical, which comprises reacting a compound of the formula

where $a$, $b$, $c$, X, Y and Z have the same meaning as above, with sodium hydride and a boronfluoride etherate.

14. A process of preparing a compound of the formula

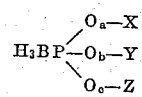

where $a$, $b$ and $c$ are each integers selected from zero and one, the sum of $a+b+c$ is at least one, and each of X, Y and Z is an aralkyl radical wherein the alkyl group having the free valence contains from 1 to 4 carbon atoms, which comprises reacting a compound of the formula
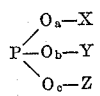
where $a$, $b$, $c$, X, Y and Z have the same meaning as above, with sodium hydride and a boronfluoride etherate.
References Cited in the file of this patent
UNITED STATES PATENTS
2,921,095    Burg et al. _____ Jan. 12, 1960
OTHER REFERENCES
Reetz: "J. Am. Chem. Soc.," vol. 82, No. 19, Oct. 5, 1960, pp. 5039–5042.